(12) United States Patent
Joshi

(10) Patent No.: US 10,971,123 B2
(45) Date of Patent: Apr. 6, 2021

(54) MUSIC COMPOSITION TOOLS ON A SINGLE PANE-OF-GLASS

(71) Applicant: Vertical Craft, LLC, Apopka, FL (US)

(72) Inventor: Dhruv Ashwin Joshi, Apopka, FL (US)

(73) Assignee: Vertical Craft, LLC, Apopka, FL (US)

( * ) Notice: Subject to any disclaimer, the term of this patent is extended or adjusted under 35 U.S.C. 154(b) by 0 days.

(21) Appl. No.: 16/569,190

(22) Filed: Sep. 12, 2019

(65) Prior Publication Data
US 2020/0005743 A1    Jan. 2, 2020

Related U.S. Application Data

(63) Continuation of application No. 16/052,452, filed on Aug. 1, 2018, now Pat. No. 10,468,001, which is a (Continued)

(51) Int. Cl.
*G10H 1/00*      (2006.01)
*G06F 3/0488*      (2013.01)
(Continued)

(52) U.S. Cl.
CPC ....... *G10H 1/0058* (2013.01); *G06F 3/04886* (2013.01); *G10G 1/00* (2013.01); *G10H 1/0008* (2013.01); *G10H 1/0033* (2013.01); *H04N 21/233* (2013.01); *G10H 2220/101* (2013.01); *G10H 2240/171* (2013.01)

(58) Field of Classification Search
CPC .. G10H 1/0058; G10H 1/0033; G10H 1/0008; G10H 2220/101; G10H 2240/171; G06F 3/04886; G10G 1/00; H04N 21/233
See application file for complete search history.

(56) References Cited

U.S. PATENT DOCUMENTS

| | | | |
|---|---|---|---|
| 6,429,366 B1 * | 8/2002 | Terada | G10H 1/0008 434/307 A |
| 10,043,502 B1 | 8/2018 | Joshi | |

(Continued)

FOREIGN PATENT DOCUMENTS

| | | |
|---|---|---|
| EP | 2541389 A1 | 1/2013 |
| WO | 2016018287 A1 | 2/2016 |
| WO | 2017136250 A1 | 8/2017 |

*Primary Examiner* — Jeffrey Donels
(74) *Attorney, Agent, or Firm* — Perkins Coie LLP; Colin Fowler

(57) ABSTRACT

The disclosure is directed to a system to create a musical compilation utilizing multiple tools on a single pane-of-glass (screen). The system may include a text display module that may display text. The system may include an interactive portion located adjacent to the text display module. The interactive portion may include a playback module configured to output musical notes upon a first action onto a playback module interaction area. The interactive portion may include a recording module configured to record sounds upon a first action on a recording module interaction area. The interactive area may include a drafting module configured to allow modification of the text upon a first action on the drafting module interaction area. The playback module interaction area may be located adjacent to the recording module interaction area and the drafting module interaction area.

20 Claims, 12 Drawing Sheets

Related U.S. Application Data continuation of application No. 15/793,752, filed on Oct. 25, 2017, now Pat. No. 10,043,502.

(60) Provisional application No. 62/534,134, filed on Jul. 18, 2017.

(51) Int. Cl.
*G10G 1/00* (2006.01)
*H04N 21/233* (2011.01)

(56) References Cited

U.S. PATENT DOCUMENTS

| | | | |
|---|---|---|---|
| 2003/0100965 A1* | 5/2003 | Sitrick | G10H 1/0008 700/83 |
| 2003/0110925 A1* | 6/2003 | Sitrick | G10H 1/365 84/477 R |
| 2003/0110926 A1* | 6/2003 | Sitrick | G10H 1/0008 84/477 R |
| 2008/0190271 A1* | 8/2008 | Taub | G10H 1/0058 84/645 |
| 2009/0228799 A1* | 9/2009 | Verbeeck | G06F 16/638 715/727 |
| 2011/0023688 A1* | 2/2011 | Daisy | G09B 5/06 84/483.1 |
| 2012/0072841 A1* | 3/2012 | Moricca | G06Q 50/10 715/716 |
| 2012/0116559 A1* | 5/2012 | Davis | G06F 3/04886 700/94 |
| 2012/0312145 A1* | 12/2012 | Kellett | G10H 1/38 84/613 |
| 2014/0174279 A1* | 6/2014 | Wong | G10H 1/0025 84/609 |
| 2015/0163345 A1* | 6/2015 | Cornaby | G06F 3/0236 345/633 |
| 2016/0042765 A1* | 2/2016 | Saini | G06F 3/04847 715/723 |
| 2016/0124636 A1* | 5/2016 | Valade | G06F 3/04886 715/773 |
| 2016/0163297 A1* | 6/2016 | Trebard | G10H 1/0025 84/610 |
| 2017/0263225 A1* | 9/2017 | Silverstein | G10H 1/0025 |
| 2017/0263226 A1* | 9/2017 | Silverstein | G06N 7/005 |
| 2018/0018898 A1* | 1/2018 | Humphrey | G06Q 50/00 |
| 2019/0027124 A1 | 1/2019 | Joshi | |

* cited by examiner

MUSIC COMPOSITION TOOLS ON A SINGLE PANE-OF-GLASS

CROSS-REFERENCE TO RELATED APPLICATION(S)

This application is a continuation of U.S. patent application Ser. No. 16/052,452, titled "MUSIC COMPOSITION TOOLS ON A SINGLE PANE-OF-GLASS," filed Aug. 1, 2018, now U.S. Pat. No. 10,468,001, issued Nov. 5, 2019, which is a continuation of U.S. patent application Ser. No. 15/793,752, titled "MUSIC COMPOSITION TOOLS ON A SINGLE PANE-OF-GLASS," filed Oct. 25, 2017, now U.S. Pat. No. 10,043,502, issued Aug. 7, 2018, which claims the benefit of U.S. Provisional Application Ser. No. 62/534,134 titled "MUSIC COMPOSITION TOOLS ON A SINGLE PANE-OF-GLASS" filed Jul. 18, 2017, which is incorporated herein by reference for all purposes in its entirety

TECHNICAL FIELD

Embodiments relate to composing music. The embodiments more particularly relate to recording a music compilation utilizing multiple recording tools on a single "pane-of glass" (screen).

BACKGROUND

Musical compilations are commonly created over multiple iterations. An artist may create lyrics and affix them to a tangible medium. The artist may also generate musical notes using one or more instruments, and record the musical notes using an audio recording device. A musical compilation may be created by recording the lyrics and the music on the same medium. Modifying the lyrics and musical notes is generally an iterative process, taking multiple forms before becoming a final musical compilation.

As the popularity of shared media files has risen, there has been an increasing desire to add complexity to media files. Prior media/music file editing systems and programs are complicated and include a tremendous (and sometimes confusing) array of functionality. Alternatively, editing some systems do not provide sufficient functionality. Among the complicated editing systems, music editing systems and programs are not always intuitive, and can be expensive and resource intensive.

DETAILED DESCRIPTION

Embodiments are disclosed for a system to record a musical compilation utilizing multiple tools on a single screen. The system may concurrently display text that may be modified, output musical notes, and record sounds. This may allow an artist to draft lyrics, output musical notes, and record sounds on a single screen. Creating a musical compilation on a single screen may allow the artist to create various parts of a musical compilation in multiple iterations on the same screen.

In use, a producer transmits an audio file to an artist. The audio file may be a demo track to help inspire the artist to further composition. The artist may access the audio track via an embodiment of the disclosed music composition tool. On a single pane-of-glass, the artist is able to control playback of the demo track while simultaneously jotting down lyrics and thoughts on a notepad. On the same screen, the artist is able to trigger a recording feature associated with a particular point in time on the demo track. The recording feature enables the artist to supplement the demo track with sung lyrics, audio notes, additional recorded music, beat boxing, or other suitable recordable elements known in the art.

Once the artist has begun supplementing the demo track with text and other recordings, the music composition system saves all of the elements to a project folder. This project folder is made available via a cloud server to a sound engineer that will be working with the artist in a more formal recording studio. The disclosed embodiments aid in the ease of organization for the artist. In some embodiments, multiple artists may collaborate and share recorded expression on a single screen.

The system may include a text display module to display text on the device display. The system may include an interactive portion. The interactive portion may be located adjacent to the text display module. The interactive portion may include a playback module configured to output musical notes upon a first action onto a playback module interaction area. The interactive portion may include a recording module configured to record sounds upon a first action on a recording module interaction area. The interactive area may include a drafting module configured to allow modification of the text upon a first action on the drafting module interaction area. The playback module interaction area may be located adjacent to the recording module interaction area and the drafting module interaction area.

Figure 1:
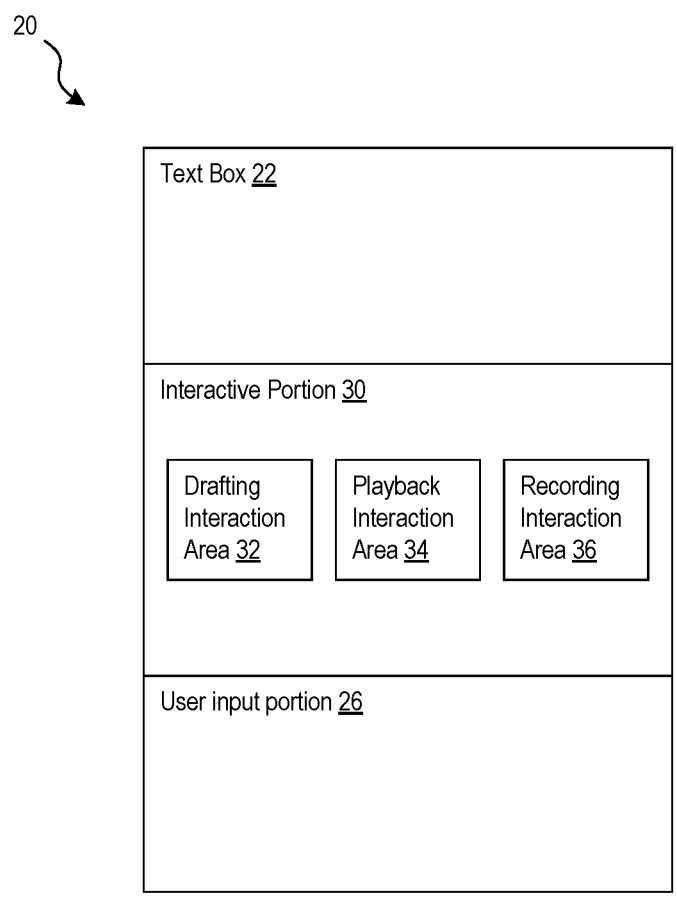
FIG. 1 is an example system to record a musical compilation, in accordance with certain embodiments.

FIG. 1 is an example system 20 to record a musical compilation, in accordance with certain embodiments. The system 20 may include a text display module 22. The text display module 22 may include a text display module interaction area 22. The text display module 22 may include text 24. The text display module 22 may display text 24 on the device display. The text display module 22 may modify the text 24 based on an action to the user input portion 26.

As illustrated in FIG. 1, the user input portion 26 may include a keyboard module 27. The keyboard module 27 may be configured to modify, add, or omit text 24 from the text display module 22. The keyboard module 27 may be disposed adjacent to the interactive area 30. The keyboard module 27 may be displayed or hidden based on an action to the drafting module interaction area 32.

The system 20 may include an interactive area 30. The interactive area 30 may be disposed adjacent to the text display module 22. The interactive area 30 may include a drafting module 32. The drafting module 32 may include a drafting module interaction area 32. The drafting module 32 may be configured to allow modification of the text 24 in the text display module 22. The interactive area 30 may include a playback module 34. The playback module 34 may include a playback module interaction area 34. The playback module 34 may be configured to output an audio file. The interactive area 30 may include a recording module 36. The recording module 36 may include a recording module interaction area 36. The recording module 36 may be configured to record sounds.

Figure 2A:
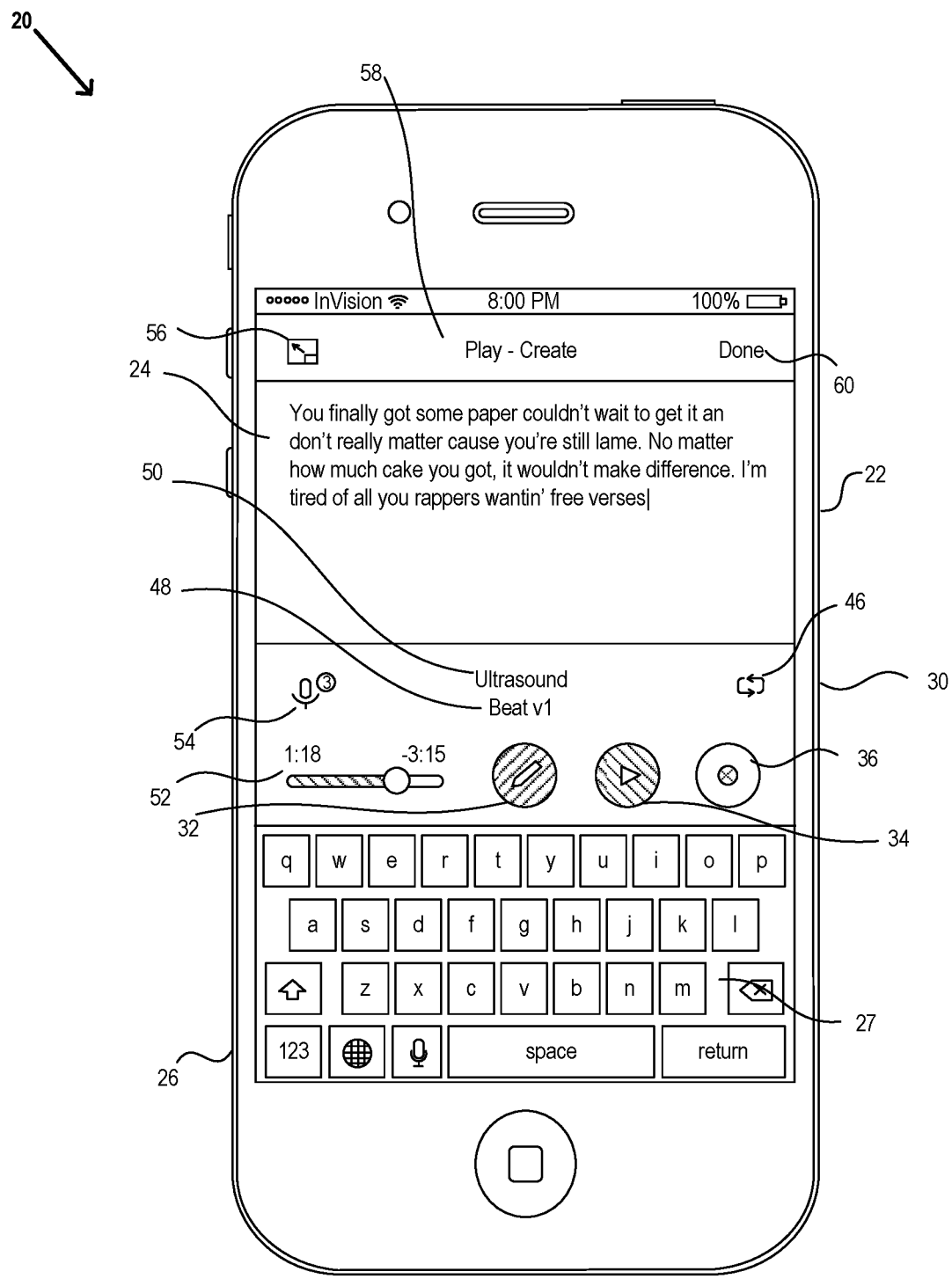
FIG. 2A is an example system to record lyrics and sounds, in accordance with certain embodiments.
Figure 2B:
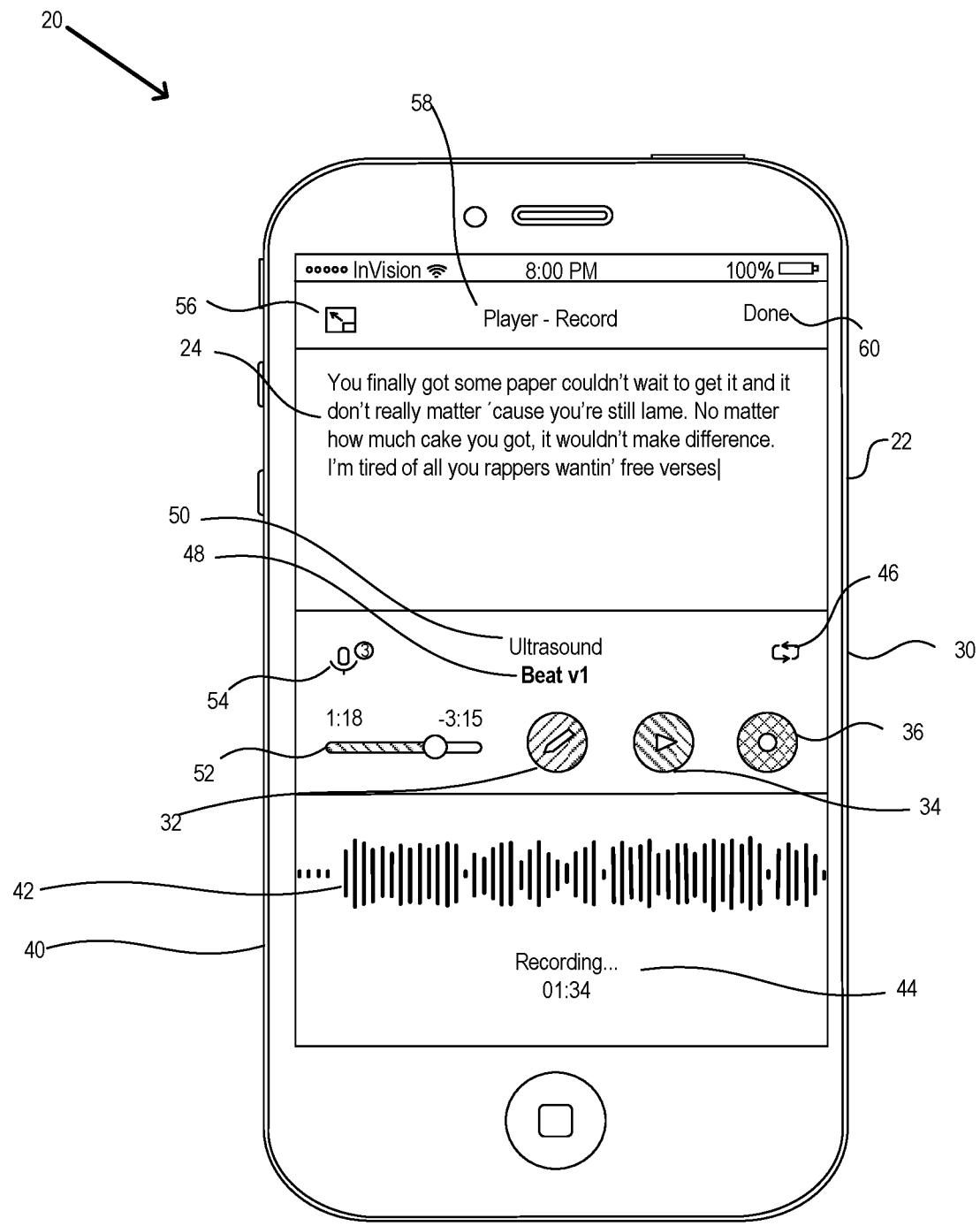
FIG. 2B is an example system to record music a musical compilation, in accordance with certain embodiments.

FIGS. 2A and 2B are examples system 20 to record lyrics and sounds, in accordance with certain embodiments having a variable user input portion 26. The system 20 may include a text display module interaction area 22. The text display module interaction area 22 may be configured to allow modification of the text 24 upon a first action on the text display module interaction area 22. The text display module interaction area 22 may be configured to prevent further modification of the text 24 upon a second or subsequent action on the text display module interaction area 22. The text display module interaction area 22 may be configured to allow the space cursor to be moved upon an action on the text display module interaction area 22. An action may include a single tap or click on an interaction area, a double tap, or another known pattern to indicate an action on an interaction area.

As illustrated in FIG. 2A, the interactive portion 31 may include a drafting module interaction area 32 (e.g., text entry button). The drafting module interaction area 32 may also be called a pen button 32. The drafting module interaction area 32 may contain a shape similar to a pen, pencil, or another similar design to indicate modification of the text 24. The drafting module interaction area 32 may comprise a specific portion of the device display, and an action within the interaction area 32 may allow for the drafting module 32 to allow modification of the text 24.

For example, if a user using a touchscreen places their finger on the drafting module interaction area 32, this may indicate a first action onto the drafting module interaction area 32, and the drafting module interaction area 32 may allow for the modification or adding of text 24 within the text display module 22. As another example, if a user controls a conventional computer mouse connected to a computer system, and clicks on the drafting module interaction area 32, the system 20 will perform the function associated with the action of clicking on the drafting module interaction area 32.

In some embodiments, a first action anywhere within the drafting module interaction area 32 may allow for a keyboard module 27 to display. The drafting module interaction area 32 may comprise a first display type. For example, the drafting module interaction area 32 may comprise a first display type, such as a dark background with a white pencil display. Furthering the above example, if the drafting module interaction area 32 receives a first action, the drafting module interaction area 32 may comprise a second display type, such as a white background and a dark pencil display, for example. Each interaction area may have multiple display types that may display upon a first action or a second action onto the interaction area.

The keyboard module 27 may include an alphanumeric keyboard comprising any conventional language, such as English, for example. The keyboard module 27 may be configured to have separate interaction areas for each letter, symbol or command, and an action to any of the separate interaction areas may allow for the text 24 of the text display module 22 to be modified. The keyboard module 27 may be disposed on the device display, as shown in FIG. 2A. The keyboard module 27 may be located remotely from the device, such as a conventional desktop-computer keyboard. The system 20 may utilize another method to modify the text 24, such as audio or visual based methods of indicating modifications to text. The system may utilize speech recognition to modify the text 24.

As shown in FIG. 2A, the interactive portion 30 may include a playback module 34. The playback module interaction area 34 (e.g., a playback button) may also be considered a play button 34. The playback module interaction area 34 may be disposed adjacent to the drafting module interaction area 32. The playback module 34 comprises a playback module interaction area 34. The playback module interaction area 34 may be configured to output audio data upon an action onto the playback module interaction area 34 through a speaker. Retrieving and accessing audio files will be discussed in detail within the discussion of FIG. 5. The playback module 34 may play an audio file upon a first action onto the playback module interaction area 34. The playback module 34 may stop the output of the audio file upon a subsequent action onto the playback module interaction area 34.

As illustrated in FIG. 2A, the playback module interaction area 34 may comprise a first display type. For example, the first display type may comprise a background and a shape, such as the triangular play shape shown in FIG. 2A. When the audio file is playing, the playback module interaction area 34 shape may comprise two vertical columns, resembling a pause button. The background may comprise a color that contrasts with a second color of the shape. For example, the background color may comprise a dark color, and the shape may comprise a light color. In some embodiments, the playback module interaction area 34 may comprise a first display type, and upon an action on the playback module interaction area 34, may comprise a second display type. The second display type may be different from the first display type, for example, the second display type may comprise a light color as the background color, and a light color as the shape color.

The interaction area 30 may comprise a recording module 36. The recording module may comprise a recording module interaction area 36 (e.g., a record button) configured to perform a function upon an action onto the recording module interaction area 36. The recording module interaction area 36 may be disposed adjacent to the playback module interaction area 34 and the drafting module interaction area 32. The recording module 36 may be configured to begin recording all sound upon an action onto the recording module interaction area 36. The recording module 36 may be configured to stop recording all sound upon a subsequent action onto the recording module interaction area 36.

FIG. 2B is an example system to record music a musical compilation, in accordance with certain embodiments. The system 20 may be configured to record sounds using the recording module 36. In accordance with some embodiments, the system 1 may include a recording display 40. The recording display 40 may be displayed when the recording module 36 is recording sounds. The recording display 40 may be displayed when the recording module interaction area 36 receives a first action.

The recording display 40 may include a sound level indicator 42. The noise level indicator 42 may display the intensity of the recorded sounds. The sound level indicator 42 may indicate the intensity of the noise level over a given period of recording time by the length of one of a plurality of bars. For example, if the recording module 36 receives no sound from the microphone while recording, the sound level indicator 42 will display a bar with a short length. Additionally, if the recording module 36 receives a high output from the microphone while recording, the sound level indicator 42 will display a bar with a longer length. The sound level indicator 42 may indicate the noise level of the present time on a first side of the display, such as the right side, for example. As time progresses, the progress bar moves to a second side (e.g., such as the left side). The bars of the sound level indicator 42 may be positioned vertically.

The recording display 40 may include a recording time indicator 44. The recording time indicator 44 may indicate how much time has passed since recording has begun. The recording time indicator 44 may also indicate that the recording module 36 is recording by, for example, displaying the word "recording . . . " in the recording display 40.

In accordance with some embodiments, the interaction area 30 may include a repeat interaction area 46. The repeat interaction area 46 may continually repeat the audio file in the playback module 34 upon a single action onto the repeat interaction area 46. The interaction area 30 may also include a song name display 48 and an album name display 50. The song name display 48 may display the given name of the audio file 76 in the playback module 34. The album name display 50 may display the given name of the audio folder 74 or project upon which the audio file 76 is stored.

The interaction area 30 may include a progress bar 52. The progress bar 52 may be configured to display the progress of the audio file being played in the playback module 34. The progress bar 52 may include a beginning time, ending time, and where the audio file is currently at in relation to the end of the audio file. For example, as shown in FIG. 2B, if the audio file is 4 minutes and 33 seconds long, and the playback module has played back 1 minute and 18 seconds of the audio file, the remaining time displayed may be 3 minutes and 15 seconds. The progress bar 52 may be interacted with, as the progress bar may be configured to change the time of the audio file based on an interaction on the progress bar 52.

The interaction area 30 may include a microphone interaction area 54. The microphone interaction area 54 may include multiple functions, such as the ability for the user to name a song upon a first action on the microphone interaction area 54. The microphone interaction area 54 may also allow other audio files to be viewed upon a first action onto the microphone interaction area 54. Other functionality and location of the interaction areas in the interactive area 30 may be modified based on user preference.

In some embodiments, a musical compilation may be created using the system 20. A musical compilation may comprise recording a sound and outputting the audio file simultaneously. The sound may comprise the artist repeating the lyrics in the text display module 22 with the outputted audio file from the playback module 34. A sound may be recorded upon a first action on the recording module interaction area 36. The audio file may be outputted upon a first action on the playback module interaction area 34. Upon a second action on the recording module interaction area 36, the musical compilation consisting of the sounds recorded and the outputted audio file may be stored.

The system 20 as disclosed may allow for the creation of a musical compilation within a single screen. This may be advantageous, as rather than recording a musical compilation on multiple forms of media on multiple screens, the lyrics may be displayed while an audio file may be outputted and sounds may be recorded all within a single system 20.

Figure 3:
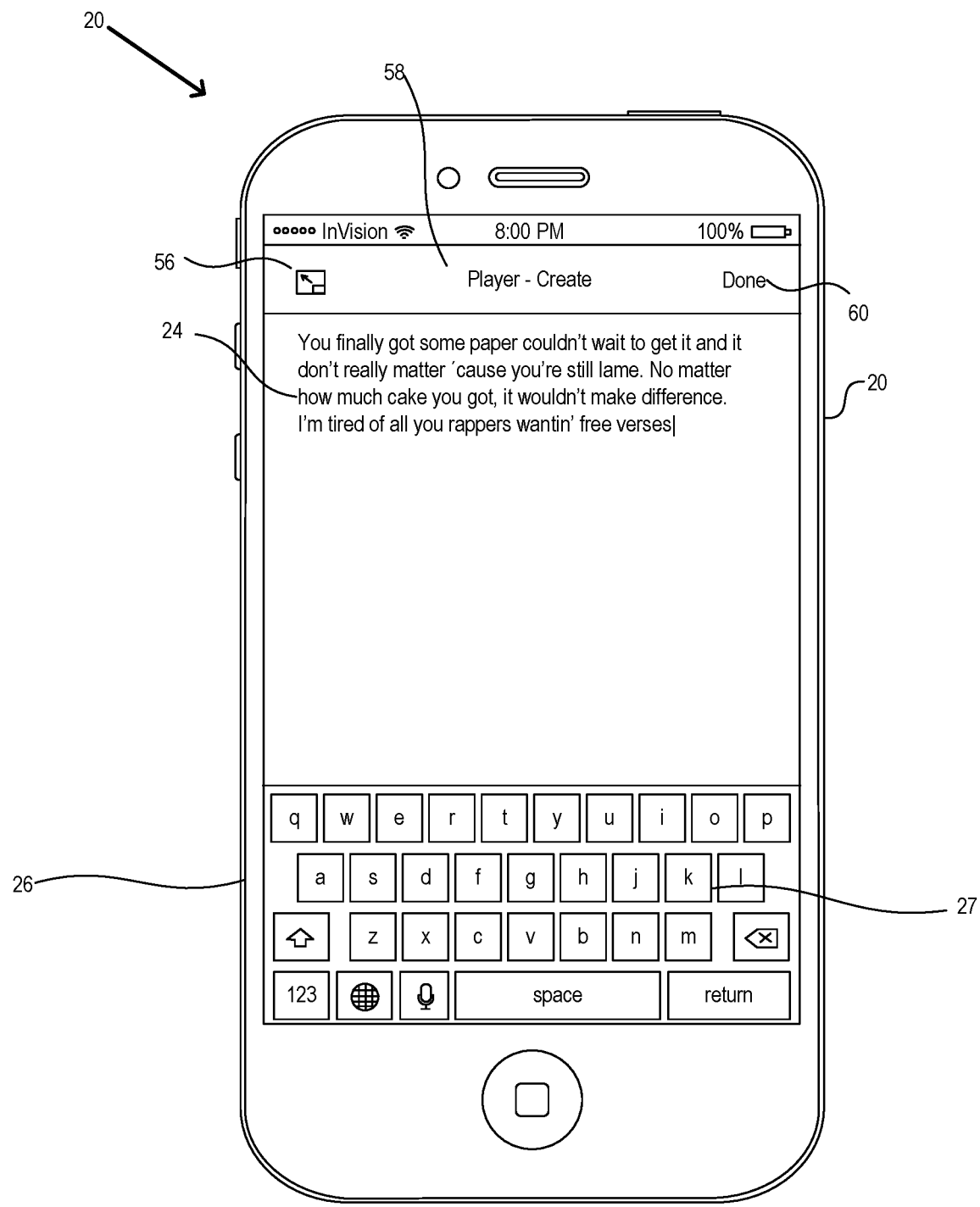
FIG. 3 is an example system to record lyrics, in accordance with certain embodiments.

FIG. 3 is an example system 20 to record lyrics, in accordance with certain embodiments. The text display module 22 and the interactive area 30 may be configured to change in size on the device display. The text display module 22 may be enlarged by removing the interaction area 30. As shown in FIG. 3, the text module display 22 may be located adjacent to the keyboard module 27.

In some embodiments, the system 20 as illustrated in FIG. 2A may be changed to appear substantially similar to the system as illustrated FIG. 3 by a single action on an enlarge button 56. The enlarge button 56 may remove the interaction area 30 upon a first action on the enlarge button 56. The single action on the enlarge button 56 may allow for the text display module 22 to be enlarged to better view the text 24, while the interaction area 30 may be hidden to provide additional space for the text display module 22 and the keyboard module 27.

The system 20 may include a screen type display 58. The screen type display 58 may display the name of the screen type being displayed. As illustrated in FIG. 3, the screen type display 58 shows that the display represents the "Player Create" screen. The screen type display name 58 may change as various displays are presented, such as, for example, the display in FIG. 2B displays the screen type display 58 to show "Player Record."

In some embodiments, the system 20 may include a done interaction area 60. The done interaction area 60 may be configured to store the lyrics in the text display module 22 and move the display to another screen upon a single action onto the done interaction area 60. A single action onto the done interaction area 60 may lead to a screen similar to that as illustrated in FIG. 4.

Figure 4:
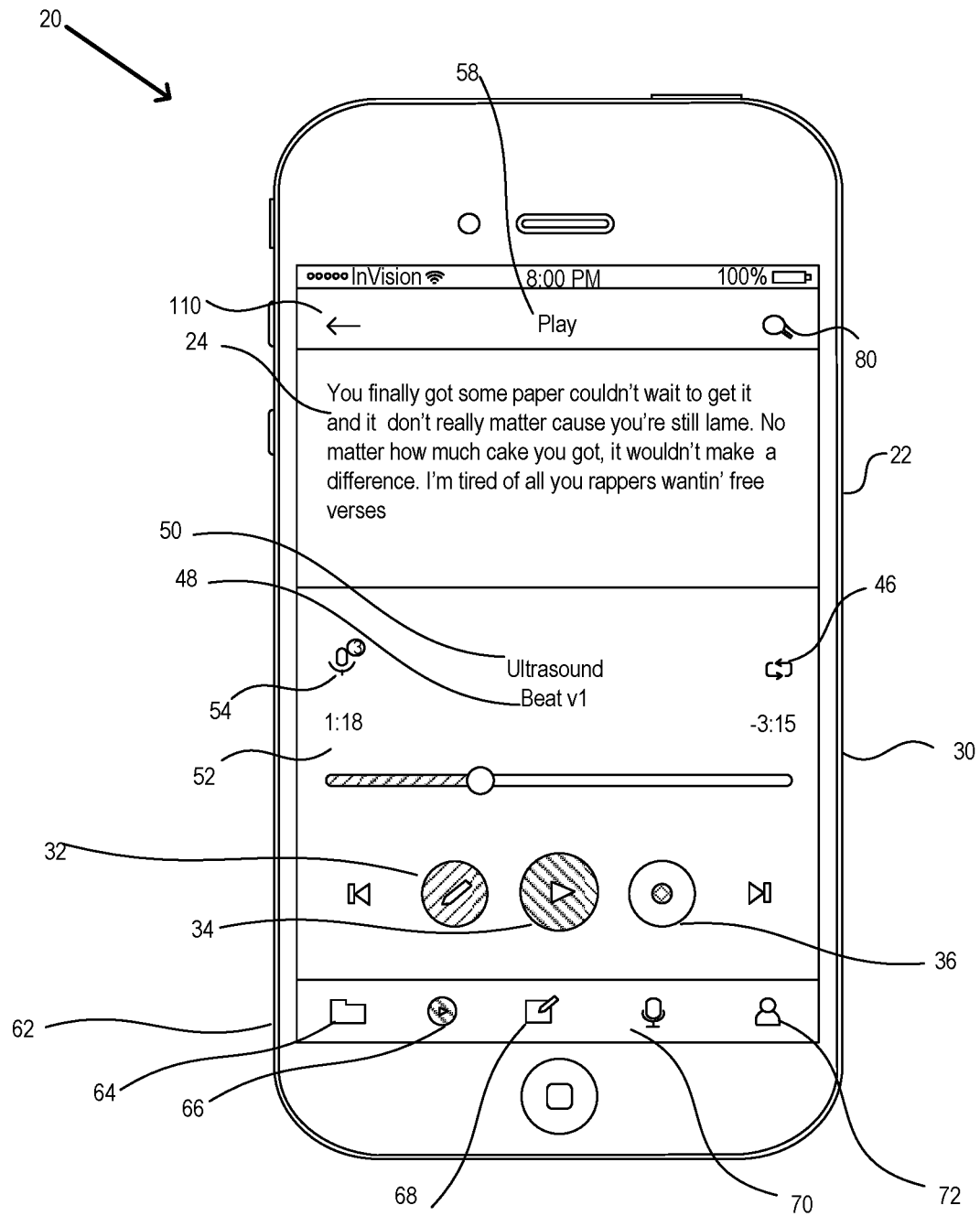
FIG. 4 is an example system to view lyrics and record a musical compilation, in accordance with certain embodiments.

FIG. 4 is an example embodiment to view lyrics and record a musical compilation, in accordance with certain embodiments. As shown in FIG. 4, the keyboard module 27 may be hidden, which may allow for the interactive area 30 to be enlarged in the display. The display as shown in FIG. 4 may be preferable to record a musical compilation if the text 24 is no longer in need of modification, and the interactive area 30 is enlarged. The text display module 22 and the interactive area 30 may change sizes as the screen changes to assist in creating various forms of music, such as creating lyrics in FIG. 3, for example.

In some embodiments, the system 20 may include a toolbar menu 62. The toolbar menu 62 may be configured to allow efficient access to the various lyrics, recordings, and audio files, for example. The toolbar menu 62 may include a file button 64, which may allow for a screen substantially similar to the screen of FIG. 5 to be displayed. The toolbar menu 62 may include an audio button 66, which may allow for a display depicting each audio file stored and available to the user upon a first action onto the audio button 66. The toolbar menu 62 may include a lyrics button 68, which may allow for a screen showing stored lyrics to be displayed upon a first action onto the lyrics button 68. The lyrics screen displayed may be substantially similar to the example of FIG. 8A. The toolbar menu 62 may include a recordings button 70, which may allow a recordings screen to be displayed upon a first action onto the recordings button 70. The recordings screen displayed may comprise a listing of recordings created and stored. The toolbar menu 62 may include a profile button 72, which may allow the profile screen to be displayed upon a first action onto the profile button 72. The profile screen displayed may be substantially similar to the display in FIG. 7A.

Figure 5:
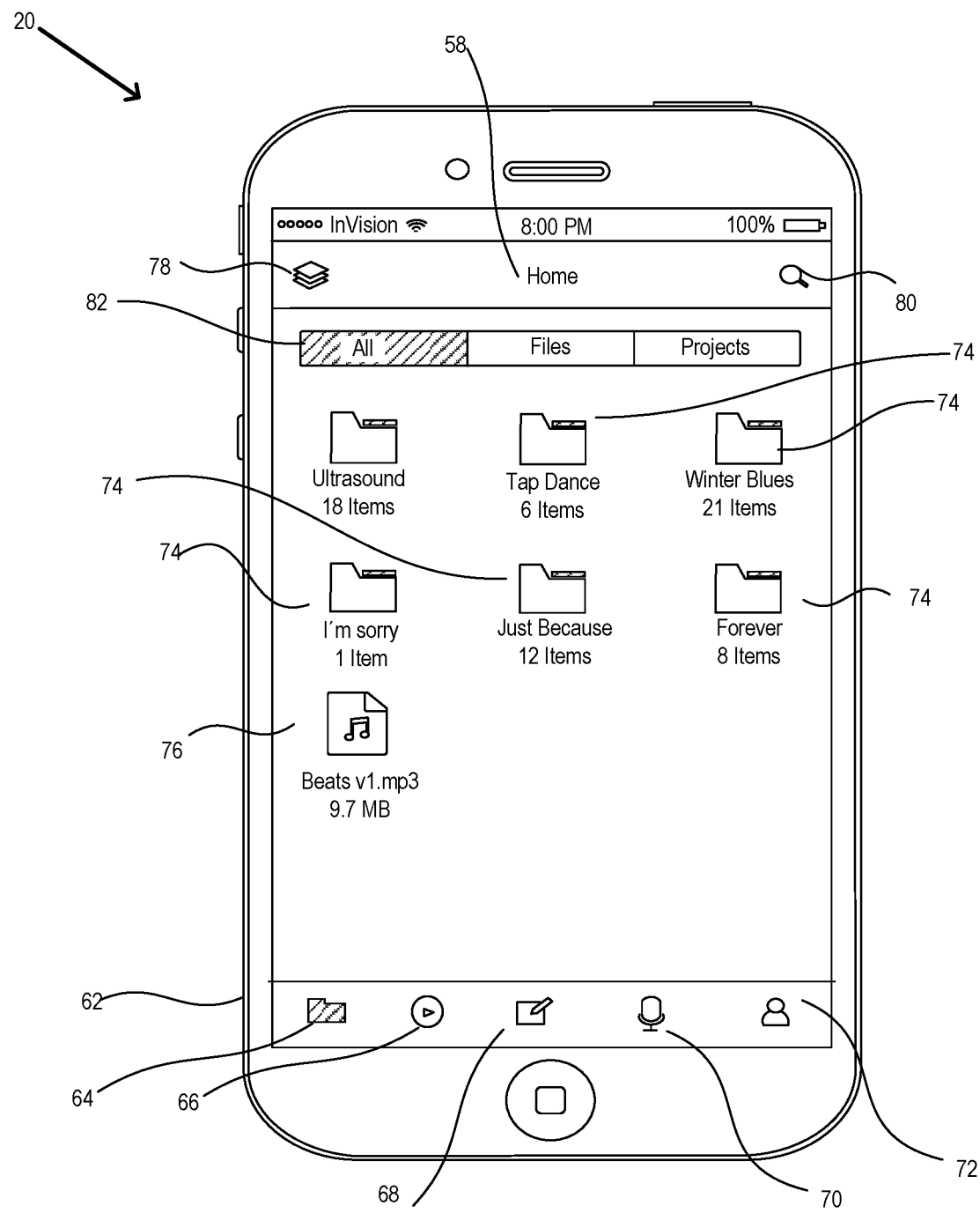
FIG. 5 is an example system to access music files, in accordance with certain embodiments.

FIG. 5 is an example system 20 to access music files, in accordance with certain embodiments. The system 20 may display multiple audio folders 74 and music files 76. Each audio folder 74 may be a directory containing various music files 76. The music files 76 under the directory of an audio folder 74 may be accessed upon a first action onto the audio folder 74. The system 20 may display a plurality of audio folders 74 and music files 76. The music files 76 may comprise musical compilations generated by recording sounds using the recording module 36 and playing an audio file using the playback module 34. The music files 76 may comprise producer sample track that may be an audio file configured to output upon a first action onto the playback module 34.

In accordance with some embodiments, the music files 76 may comprise audio files received from a remote device. For example, a remote client device may transmit the audio file to the system 20. The audio file may be saved using a memory device, and available as a music file 76 for future recording and playback. Each audio folder 74 and music file 76 may be automatically named by the system when the audio folder 74 or music file 76 is generated or uploaded. Each audio folder 74 and music file 76 may be named or renamed by the user. A music file 76 may be configured to move into the directory of an audio folder 74 by dragging the music file 76 into the audio folder 74 on the display.

The audio folders 74 and music files 76 may be accessed by multiple users, which may allow collaboration between multiple parties to create a collaborative musical compilation on a single screen. The system 20 may allow users to transmit a particular audio folder 74 or music file 76 to another user. One of many authorized users may modify the music file 76, and the music file 76 may be updated for each user authorized to edit the music file 76. The users may transmit a music file 76 using a communications protocol such as internet protocol, Bluetooth, Wi-Fi, or another conventional communication protocol.

In some embodiments, the audio folders 74 and music files 76 may be stored on a remote storage module connected to the internet. The audio folders 74 and music files 76 may be stored in a cloud-based computing device. One user may generate a music file 76, for example, and the music file 76 may be stored in the cloud-based computing device. When a second user would like to download the music file 76 and modify the music file 76, the second user may access the music file 76 stored at the cloud-based computing device. The second user may upload the music file 76 to the cloud-based computing device after the music file 76 has been modified. This may allow for collaboration on a single screen, and for real-time collaboration and modification to lyrics, music notes, and musical compilations.

As illustrated in FIG. 5, the system 20 may include a file settings button 78. The file settings button 78 may allow for audio folders 74 and music files 76 to be added, deleted, or renamed. The system 20 may include a search button 80. The search button 80 may search the audio folders 74 and the music files 76 based on search criteria entered using the keyboard module 27. The system 20 may include a file navigation plane 82 the file navigation plane 82 may allow for all files to be shown, just music files 76, or just projects like audio folders 74 to be shown upon a first action on the file navigation plane 82.

Figure 6A:
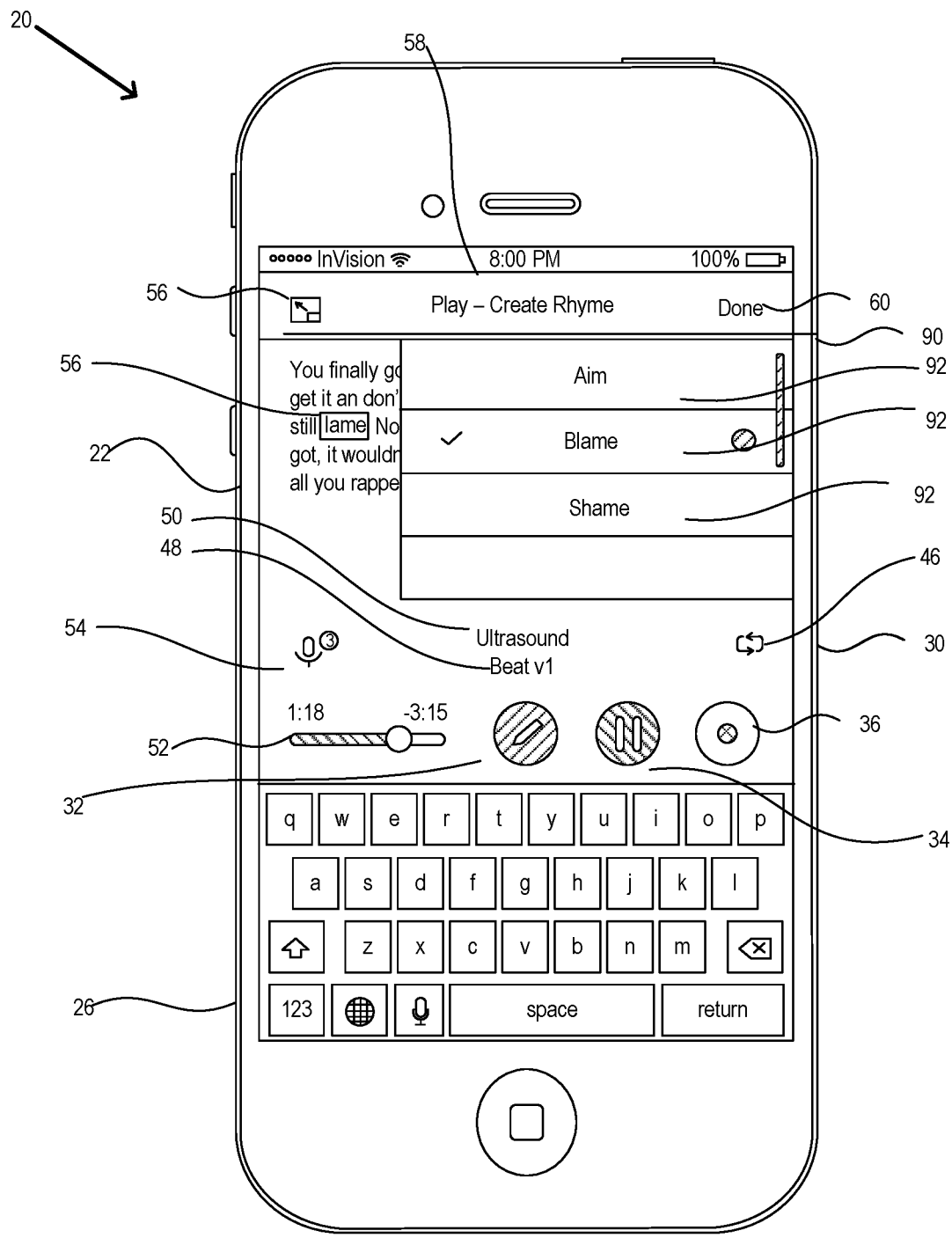
FIG. 6A is an example system to provide suggested words, in accordance with certain embodiments

FIG. 6A is an example system 20 to provide suggested words 92, in accordance with certain embodiments. In some embodiments, the text display module 22 may include a suggested words module 90. The suggested words module 90 may be configured to display suggested words 92 of a selected word in the text 24 within the text display module 22. The word may be selected by a first action on a word in the text display module 22.

The suggested words module 90 may provide a list of suggested words 92 for the selected word. A word in the text display module 22 may be selected by a first on the word within the text display module 22. The suggested words module 90 may provide words that rhyme with the selected word. For example, as illustrated in FIG. 6A, if the word "lame" is selected, the suggested words module 90 may display a list of words 92 that rhyme with "lame," such as "Aim," "Blame," and "Shame." The suggested words module 90 may access a depository of suggested words 92 for a given word. The depository may be located in a storage module. The depository may be located remotely from the client device, and the system 20 may access the depository using a known communications method. The storage module containing the depository may be located in a cloud-based storage module.

Figure 6B:
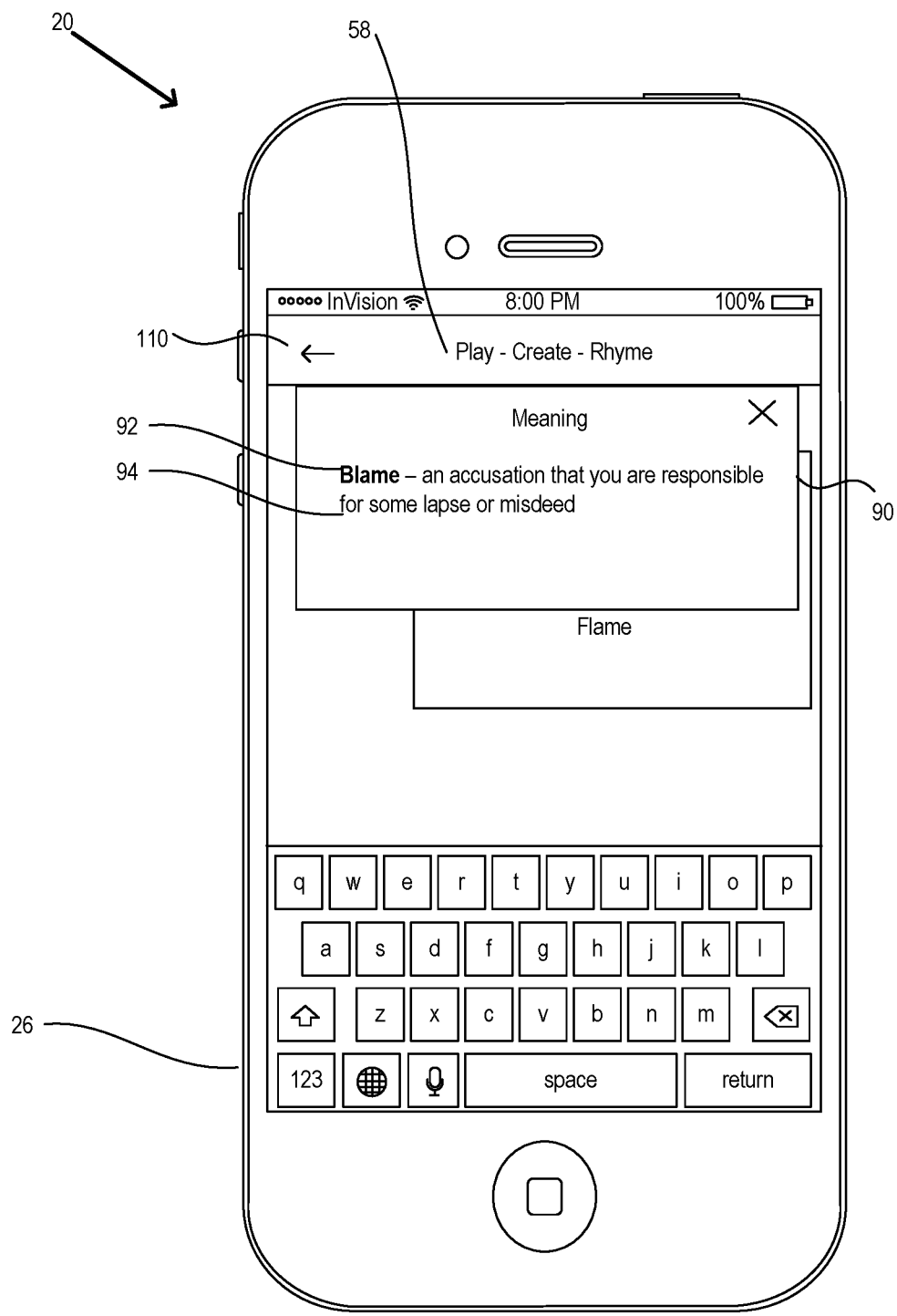
FIG. 6B is an example system to provide definitions to suggested words, in accordance with certain embodiments.

FIG. 6B is an example system to provide definitions to suggested words 92, in accordance with certain embodiments. The dictionary definition 94 for a suggested word 92 within the suggested words module 90 may be displayed upon a first action on the suggested word 92. The suggested words module 90 may utilize any conventional dictionary definition database to provide definitions 94. For example, upon a first action on the word "Blame" in FIG. 6A, the definition for the word "Blame" is shown. This may assist in the creation of lyrics by presenting words related to the selected word while providing definitions 94 for each suggested word 92.

Figure 7:
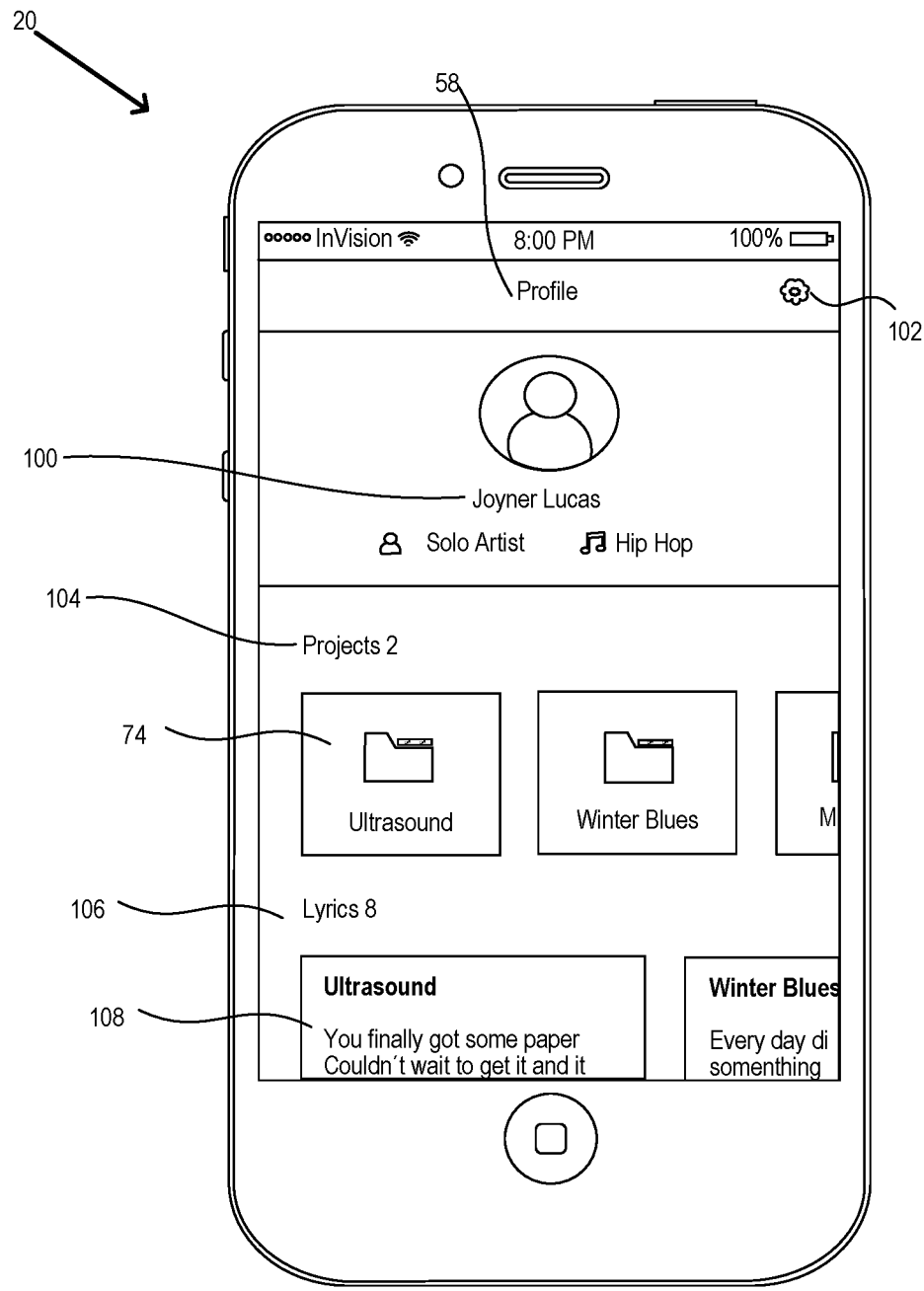
FIG. 7 is an example system to display a user profile, in accordance with certain embodiments.

FIG. 7 is an example system 20 to display a user profile, in accordance with certain embodiments. The system 20 may include profile data 100 of the user, such as the name of the user, a picture of the user, what type of artist the user is, and other known profile data points. The user may change the profile data 100. The user may change the profile data by a first action on a settings button 102. The settings button 102 may allow the profile data to be edited.

In some embodiments, the system 20 may display a projects area 104. The projects area 104 may include audio folders 74 and music files 76 associated with the user. The projects area 104 may also include projects generated by another client device. Projects displayed in the projects area 104 may be accessed by a first action on a project. The profile display 100 may display a lyrics area 106. The lyrics area 106 may include lyrics 108 or other text generated in the system 20. The lyrics area 106 may also include lyrics 108 uploaded by the user or another client device. Lyrics displayed in the lyrics area 106 may be accessed by a first action on the lyrics 108. The profile display may display a recordings area 110. The recordings area 110 may include recordings generated by the recording module 36. The recordings area 110 may also include recordings generated by another client device. Recordings displayed in the recordings area 110 may be accessed by a first action onto the recordings area 110.

Figure 8:
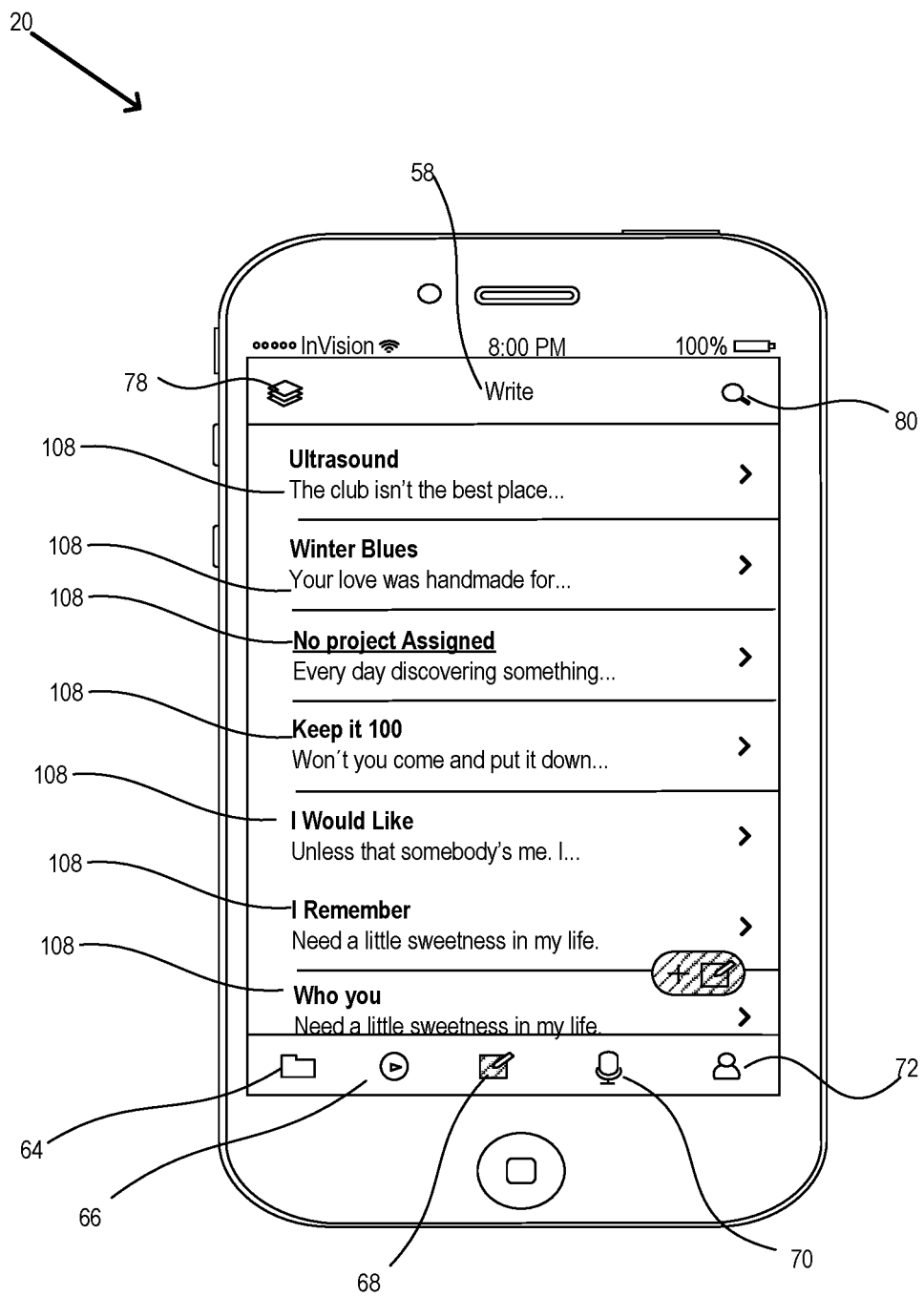
FIG. 8 is an example system to access lyrics, in accordance with certain embodiments.

FIG. 8 is an example system 20 to access lyrics 108, in accordance with certain embodiments. The system 20 of FIG. 8 may display numerous lyrics 108. Each lyric 108 may comprise a plurality of words saved to a storage module. The lyrics 108 may be modified by a first action on a lyric name. Each lyric 108 may include a specific lyric name to identify the lyrics 108. If no name is assigned upon storage or receipt at the storage module, the system 20 may automatically generate a name, such as "No Project Assigned," for example. Upon a single action onto a lyric 108 of the system 20 in FIG. 8, the lyric 108 selected may appear in the screen as shown in FIG. 3. After the lyrics are modified, the lyrics 108 may be saved. The system 20 may include a back arrow 110. The back arrow 110 is configured to leave the current screen to another screen upon a first action onto the back arrow 110. The lyrics 108 may be saved upon a first action onto the back arrow 110.

Figure 9:
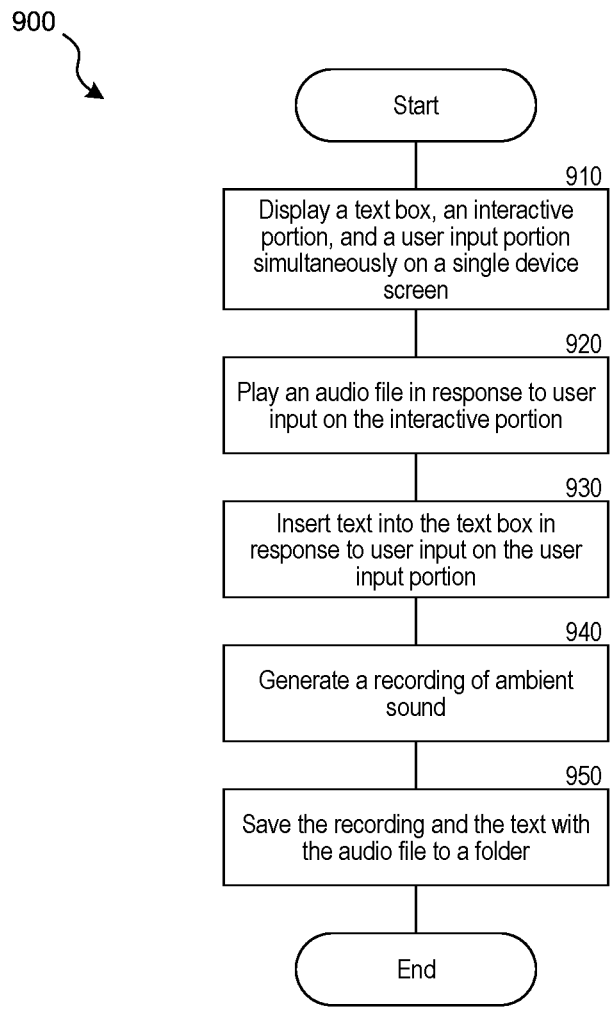
FIG. 9 is a flow diagram of a method to record a musical compilation on a single screen, in accordance with certain embodiments.

FIG. 9 illustrates a flow diagram of a method 900 to record a musical compilation on a single screen, in accordance with certain embodiments. The method 900 may allow for the recording of sounds while outputting musical notes to record a musical compilation. All recording tools may be located on a single screen, and may be accessible to create a musical compilation efficiently.

At step 910, musical notes are received at a memory device. The musical notes may be transmitted by a second device. The musical notes may be transmitted by a device controlled by a second artist or collaboration partner. The musical notes may be transmitted through a known communications protocol, such as Wi-Fi, Bluetooth, or over the internet using internet protocol (IP) addressing, for example. The memory device may be in electrical communication with a second remote memory device. The second remote memory device may be accessible to multiple devices, as to allow collaboration and modification of the musical notes stored. The second remote memory device may be in electrical communication with multiple devices using the internet. The second memory device may be a cloud-based computational memory device.

At step 920, text 24 is displayed at a text display module 22. The text display module 22 may allow for the modification of the text 24 using a keyboard module 27. The text 24 may resemble lyrics to be used in the creation of a musical compilation.

At step 930, the musical notes are outputted using a playback module 34. The playback module 34 may output the musical notes upon a first action onto the playback module interaction area 34. The playback module 34 may output the musical notes using a speaker.

At step 940, a sound may be recorded using a recording module 36. The recording module 36 may record sounds using a microphone. The sounds recorded by the recording module 36 may resemble the singing of the lyrics drafted in the text display module 22. The recording module 36 may record multiple instruments, such as one or more voices and multiple instruments, such as a piano, guitar, etc. The recording module 36 may record the sounds received at the microphone. The recording module 36 may record the sounds received at the microphone as well as the outputted musical notes outputted using the playback module 34. The recording module 36 may record a musical compilation comprising the musical notes and the sounds recorded.

At step 950, the text generated and the sound recorded is stored at the memory device. The sounds recorded may be converted into a conventional audio file, such as MP3, MP4, or another known audio file format. The text and sounds recorded may be stored dynamically as the recording module 36 records the sounds. In some embodiments, the saved audio and text are uploaded to a remote or cloud memory. A sound engineer is provided direct access to the cloud memory for efficient editing. The second remote memory device may allow multiple devices in electrical communication with the second remote memory device to access and modify the sounds recorded. In some embodiments, the supplemented text and recordings are saved to a folder with the audio file (demo track) as soon as generated. The artist is prompted either immediately for a project name for the folder, or upon shifting between projects (see FIG. 8).

The method 900 may include a recording module interaction area 36 disposed adjacent to the playback module interaction area 34. The recording module interaction area 36 and the playback module interaction area 34 may be disposed adjacent to the text display module 22.

In some embodiments, the method 900 may include playing the musical notes upon a first action on the playback module interaction area 34. The recording module 36 may stop recording sounds upon a second action on the recording module interaction area 36. The memory device may store the musical compilation comprising the musical notes and the sounds recorded. Text 24 may be inserted into the text display module 22 using a keyboard module 27. The keyboard module 27 may be located adjacent to the recording module interaction area 36 and the playback module interaction area 34. The keyboard module 27 may be configured to modify the text 24.

In accordance with certain embodiments, the system 20 may display text from a text display module 22 disposed on a device display. The system may display an interactive portion 30. The interactive portion 30 may be disposed adjacent to the text display module 22. The interactive portion 30 may include a playback module 34 including a playback module interaction area 34. The playback module 34 may be configured to output musical notes upon a single action on the playback module interaction area 34. The interactive area 30 may include a recording module 36 including a recording module interaction area 36. The recording module 36 may be configured to record a sound upon a single action onto the recording module interaction area 36. The interactive area 30 may include a drafting module 32 including a drafting module interaction area 32. The drafting module 32 may be configured to allow modification of the text 24 within the text display module 22 using a keyboard module 27 upon a single action onto the drafting module interaction area 32. The recording module interaction area 36 may be disposed adjacent to the playback module interaction area 34. The drafting module interaction area 36 may be disposed adjacent to the playback module interaction area 34. The memory device may be in electrical communication with a remote memory device configured to store the musical notes and the sounds recorded. The system 20 may be implemented on a device such as a smart phone or computer.

An Example Machine Overview

The machine-implemented operations described above can be implemented at least partially by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the embodiments introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Figure 10:
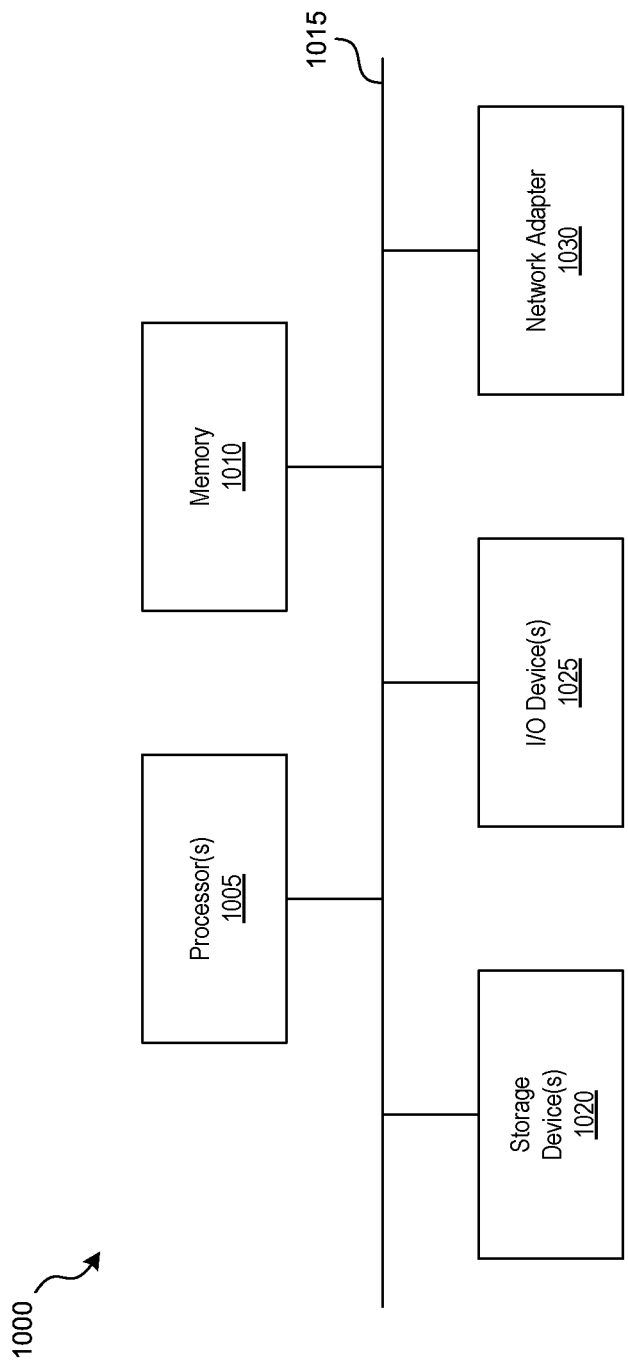
FIG. 10 is a block schematic diagram of a system in the exemplary form of a computer system within which a set of instructions for causing the system to perform any one of the foregoing methodologies and logical flows may be executed, in accordance with certain embodiments.

FIG. 10 is a block schematic diagram of a system in the exemplary form of a computer system 1000 within which a set of instructions for causing the system to perform any one of the foregoing methodologies and logical flows may be executed. Example computer systems 1000 may include, but are not limited to a smartphone, laptop computer, virtual reality device, or desktop computer, for example. The computer system 1000 may include a processor 1005, and a memory 1010. Memory 1010 may be a memory device 1010 or a remote memory device 1010. The memory 1010 may include a main memory and a static memory, which communicate with each other via an interconnect 1015. The computer system 1000 may also include an input/output (I/O) interface, for example, a USB interface, a network interface, or electrical signal connections and/or contacts.

Multiple I/O devices 1025 may be in electrical communication with the I/O interface. An example I/O device 1025 may include a speaker. The speaker may be a conventional speaker compatible with a computing system 1000 and configured to output sound. Another example I/O device 1025 may include a microphone. The microphone may record ambient audio. The microphone may include a diaphragm condenser microphone, dynamic microphone, bass microphone, or another known microphone type. The computing system 1000 may include an I/O device such as a display. The display may include a liquid crystal display, or another known display type. The display may include a touchscreen. The touchscreen may include a known capacitive touchscreen for a computing device. The display may allow a user to interact with and control the computing device. In some embodiments, the touchscreen may be configured to be physically tapped, dragged along, or pressed against to perform an action onto an interaction area.

The storage device 1020 may include a machine-readable medium on which is stored a set of executable instructions, i.e., software, embodying any one, or all, of the methodologies described herein. The software may also be shown to reside, completely or at least partially, within the memory 1010 and/or within the processor 1005. The software may further be transmitted or received over a network by means of a network adapter 1030. The network adapter 1030 may be configured to electrically connect the computer system 1000 to another remote device using a known communications protocol, such as Wi-Fi, Bluetooth, Ethernet, Fiber optics, or over the internet using a protocol such as internet protocol.

In contrast to the system 1000 discussed above, a different embodiment may use logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g., requiring cables and complex software configurations, e.g., requiring a consultant to install. For example, embodiments may provide one or more cloud computing solutions that enable users, e.g., users on the go, to access real-time video delivery on such internet-enabled or other network-enabled devices, servers, or clients in accordance with embodiments herein. It further should be appreciated that one or more cloud computing embodiments include real-time video delivery using mobile devices, tablets, and the like, as such devices are becoming standard consumer devices.

The memory device 1010 or remote memory device 1010 as disclosed herein may be configured to utilize cloud computing functionality. The memory device 1010 may be configured to be accessed by multiple devices, as to allow each of the multiple devices to retrieve and modify the data located within the memory device 1010. The memory device 1010 may be in electrical communication with the multiple devices using a known communications protocol.

The invention claimed is:
1. A system, comprising:
a processor; and
a memory including instructions that, when executed, cause the processor to:
display a text box, an interactive portion, and a user input portion simultaneously on a single device display screen, wherein the interactive portion is configured to play an audio file and generate a recording of ambient sound in response to user input on the interactive portion, wherein the text box is configured to display a set of lyrics, and wherein the user input portion is configured to modify text in the text box in response to user input on the user input portion; and save user input text and the recording with the audio file to a folder within the memory.

2. The system of claim 1, wherein the interactive portion further comprises a recording button that when activated triggers the generation of the recording.

3. The system of claim 1, wherein the interactive portion further comprises a playback button configured to play an audio file in response to activation of the playback button.

4. The system of claim 1, wherein the user input portion displays one of a keyboard module and a recording progress module at a given time.

5. The system of claim 1, wherein the interactive portion further comprises a drafting button configured to display the keyboard module in response to activation of the drafting button.

6. The system of claim 1, wherein the single device display screen only displays the text box, interactive portion and user input portion.

7. The system of claim 4, wherein the text box is configured to allow modification of the text in the text in response to user input on the keyboard module.

8. The system of claim 1, wherein the text box is configured to display suggested replacement words for a selected word in the text box in response to user input on the selected word in the text box.

9. The system of claim 8, wherein the suggested replacement words comprise words that rhyme with the selected word.

10. The system of claim 8, wherein the text box is configured to display the definition of each suggested replacement word.

11. The system of claim 2, wherein the interactive portion is further configured to stop recording ambient sound in response to a second activation of the recording button, and wherein the interactive portion is configured to stop playing the audio file in response to a second activation on the playback button.

12. The system of claim 1, wherein the memory is a cloud-based remote memory device.

13. The system of claim 12, wherein the cloud-based remote memory device is configured to allow multiple users to access and modify the folder saved in the memory.

14. A method, comprising:
displaying a text box, an interactive portion, and a user input portion simultaneously on a single device display screen, wherein the interactive portion is configured to play an audio file and generate a recording of ambient sound in response to user input on the interactive portion, wherein the text box is configured to display a set of lyrics, and wherein the user input portion is configured to modify text in the text box in response to user input on the user input portion; and
saving user input text and the recording with the audio file to a folder within the memory.

15. The method of claim 14, further comprising displaying, at the user input portion, one of a keyboard module and a recording progress module at a given time.

16. The method of claim 15, wherein the interactive portion further comprises:
a recording button configured to record ambient sound in response to activation of the recording button;
a playback interaction area configured to play an audio file in response to user input on the playback interaction area; and
a playback button configured to play an audio file in response to activation of the playback button
a drafting button configured to display the keyboard module in the user input portion in response to activation of the drafting button.

17. The method of claim 14, wherein the user input portion is disposed subjacent to the interactive portion on the single device display screen, and wherein the interactive portion is disposed subjacent to the text box on the single device display screen.

18. A method, comprising:
displaying a text box, an interactive portion, and a user input portion simultaneously on a single device screen;
in response to user input on the interactive portion, playing an audio file;
in response to user input on the user input portion, inserting text into the text box, wherein the text box is configured to display a set of lyrics;
in response to user input on the interactive portion, generating a recording of ambient sound;
saving, to a memory, the recording and the text with the audio file to a folder.

19. The method of claim 18, wherein the memory is a cloud-based remote memory device configured to allow multiple users to access and modify the folder.

20. The method of claim 18, wherein the user input portion displays one of a keyboard module or a recording progress module at a given time.

* * * * *